United States Patent [19]

Tanaka et al.

[11] Patent Number: 4,520,407
[45] Date of Patent: May 28, 1985

[54] RECORDING AND/OR REPRODUCING APPARATUS FOR A MULTI-CHANNEL DIGITAL SIGNAL

[75] Inventors: Masato Tanaka, Tokyo; Takenori Sonoda, Zama, both of Japan

[73] Assignee: Sony Corporation, Tokyo, Japan

[21] Appl. No.: 465,464

[22] Filed: Feb. 10, 1983

[30] Foreign Application Priority Data

Feb. 13, 1982 [JP] Japan ................................. 57-21895

[51] Int. Cl.³ .......................... G11B 5/00; G11B 27/02
[52] U.S. Cl. ......................................... 360/32; 360/13
[58] Field of Search ..................... 360/13, 15, 32, 62, 360/63

[56] References Cited

U.S. PATENT DOCUMENTS 4,327,382  4/1982  Tanaka ................................. 360/13
4,351,007  9/1982  Youngquist ......................... 360/13

Primary Examiner—Vincent P. Canney
Attorney, Agent, or Firm—Lewis H. Eslinger; Alvin Sinderbrand

[57] ABSTRACT

An apparatus for recording and/or reproducing a digital signal made up of a plurality of channel signals digitally recorded in respective tracks on a magnetic record medium comprises a reproducing circuit which reproduces the channel signals recorded in the respective tracks, a recording circuit associated with the tracks which records digital signals in the tracks, and a selector circuit which selectively supplies the reproduced channel signals to the recording circuit for digital recording by the latter in at least a selected one of the tracks on the magnetic record medium.

11 Claims, 5 Drawing Figures

RECORDING AND/OR REPRODUCING APPARATUS FOR A MULTI-CHANNEL DIGITAL SIGNAL

BACKGROUND OF THE INVENTION

1. Field of the Invention

This invention relates to digital recording and/or reproducing apparatuses, and more particularly, to a digital tape recorder for use with a multi-channel digital signal in which a digital signal recorded on the tape is edited and re-recorded on the tape.

2. Description of the Prior Art

In a prior art pulse coded modulation (PCM) tape recorder for use with multiple channels, editing of the recorded digital signal can be performed wherein a signal previously recorded in one channel is reproduced and recorded in another channel. Such pulse coded modulation tape recorders frequently utilize a mixer to transfer the recorded signal from one channel to another. In certain instances, the input and output cables from the recording and reproducing heads must be changed in order to transfer the recorded signal from one channel to another. Such a cable changing operation is unwieldy and inconvenient.

Analog mixers which have previously been used require the input digital audio signal to first be converted into an analog audio signal. After the mixing operation is performed, the analog audio signal is again converted to a digital audio signal and returned to the pulse coded modulation tape recorder for re-recording. It is to be appreciated that the digital to analog and analog to digital conversions cause a significant deterioration in the quality of the reproduced audio signal.

OBJECTS AND SUMMARY OF THE INVENTION

Accordingly, it is an object of the present invention to provide an apparatus for recording and/or reproducing a multi-channel digital signal which overcomes the aforesaid problems of the prior art.

It is another object of the present invention to provide an improved digital tape recorder for a multi-channel digital signal.

It is yet another object of the present invention to provide an apparatus for recording and/or reproducing a digital signal having multiple channel signals recorded on a magnetic record medium in which the channel signals can be edited together and re-recorded in another channel.

It is still a further object of the present invention to provide an apparatus for recording and/or reproducing a digital signal in which an editing operation can be performed on a digital signal, without performing digital to analog and analog to digital conversions.

In accord with the present invention, an apparatus for recording and/or reproducing a digital signal made up of a plurality of channel signals digitally recorded in respective tracks on a magnetic record medium comprises reproducing means for reproducing the channel signals recorded in the respective tracks, recording means associated with the tracks for recording digital signals in the tracks, and selector means for selectively supplying the reproduced channel signals to the recording means for digital recording by the latter in at least a selected one of the tracks on the magnetic record medium.

The above, and other objects, features and advantages of the present invention will be apparent from the following detailed description of illustrative embodiments thereof which is to be read in connection with the accompanying drawings.

DETAILED DESCRIPTION OF THE PREFERRED EMBODIMENTS

In the following description, it is assumed that the editing apparatus of the present invention is used to edit digital signals. These digital signals preferably may represent audio information and may be of the so-called PCM-encoded audio signal format. It will be readily appreciated by those of ordinary skill in the art that the digital signals may represent other information, as desired. Furthermore, in the interest of expediting the understanding of the present invention, it is assumed that the digital signals are recorded on a magnetic tape. However, other record media which are readily adapted to have information recorded thereon may be used. Furthermore, in recording the digital signals on magnetic tape, the recording and reproducing transducers or heads are fixed and the magnetic tape is movable therepast. Those of ordinary skill in the art will readily appreciate that the transducers may be of the rotary type, such as conventionally used in VTR apparatus, and that the magnetic tape may be movable in a helical pattern such that the rotary heads scan helical traces, or record tracks, across the tape.

Figure 1:
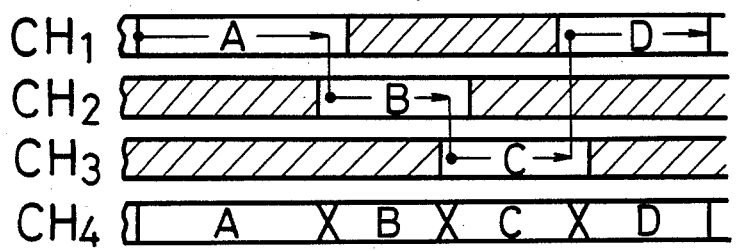
FIG. 1 is a schematic diagram to which reference will be made in explaining an editing operation performed with an embodiment of the present invention.

Referring to the figures, and initially to FIG. 1 thereof, four channels, $CH_1$ to $CH_4$, are recorded on a magnetic record medium such as a magnetic tape (not shown). As illustrated in the figure, audio PCM signals A, B, C and D are recorded in channels $CH_1$, $CH_2$, $CH_3$, and $CH_1$, respectively. The intervals denoted by the cross-hatchings indicate information which cannot be used due to, for example, a misplay or the like. It is to be appreciated that a time overlap interval or portion exists between adjacent PCM signals A, B, C and D.

The audio PCM signals A, B, C and D recorded in channels $CH_1$, $CH_2$ and $CH_3$ are selected seriatim (one after the other) and recorded in channel $CH_4$. In the representation of FIG. 1, a reproducing transducer or head (not shown) which reproduces the signals in channels $CH_1$, $CH_2$ and $CH_3$ is positioned before the reproducing transducer or head (not shown) for channel $CH_4$. Accordingly, the audio PCM signals reproduced from channels $CH_1$, $CH_2$ and $CH_3$ are transferred to the single channel $CH_4$ for recording therein. After such an editing operation, channels $CH_1$, $CH_2$ and $CH_3$ can be used to record other signals.

While FIG. 1 illustrates one type of editing operation, in which audio PCM signals from multiple channels are summarized or edited together and recorded in a single channel, it is sometimes desirable to perform other editing operations. For example, it may be desirable to transfer audio PCM signals from one channel into a second channel which contains a previously recorded PCM signal. In still a further editing operation, it may be desirable to transfer audio PCM signals from one channel to a second channel, wherein the second channel is blank.

As hereinbefore described, a prior art digital tape recorder requires a mixer connected thereto in order to perform the editing operation described with reference to FIG. 1. When such an editing operation is performed, the mixed or edited signal recorded in the track is changed seriatim from one input channel signal to the next input channel signal through the operation of the fader included in the mixer. Thus, in a prior art system, a mixer is always required in order to perform an editing operation. Persons of ordinary skill in the art will recognize that the operation of the mixer is troublesome when, for example, the input and output cables of the mixer are changed to transfer one channel signal from one track to another track. When an analog mixer is used, the quality of the reproduced signal is significantly degraded since the digital signal is first converted to an analog signal, a mixing operation is performed thereon, and the analog signal is reconverted to a digital signal before the recording operation is performed.

Figure 2:
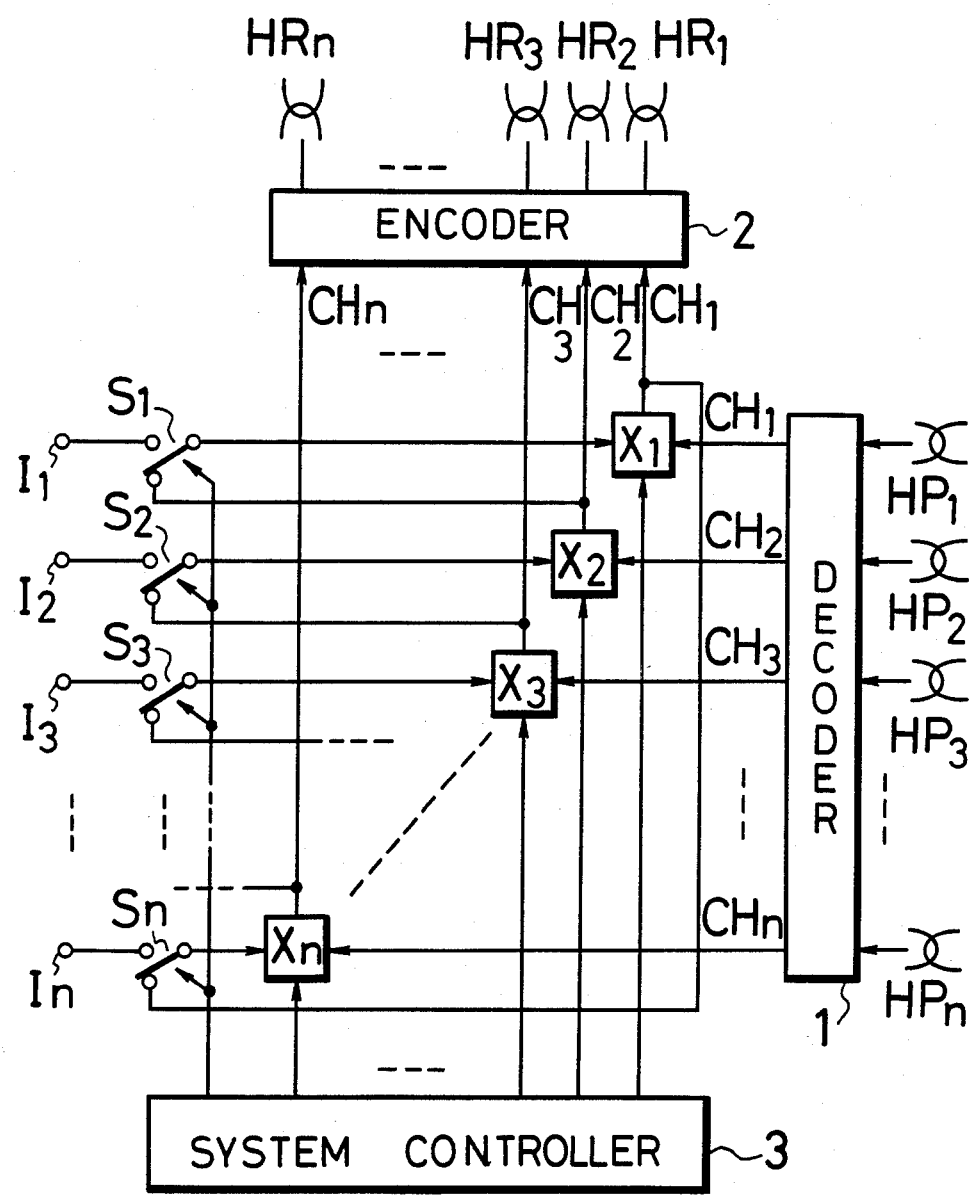
FIG. 2 is a block diagram illustrating a recording and/or reproducing apparatus in accord with the present invention.

FIG. 2 illustrates a recording and/or reproducing apparatus in accord with the present invention in which reference symbols $I_1$, $I_2$, $I_3$, ..., $I_n$ represent input terminals to which audio PCM signals for n channels are supplied. (The subscripts of the reference symbols $I_i$ identify the channel signals supplied thereto.) The audio PCM signals supplied to input terminals $I_i$ are digital signals supplied, for example, by an analog to digital converter. The recording and/or reproducing apparatus of FIG. 2 includes a reproducing decoder 1, a recording encoder 2, and a system controller 3. System controller 3 generates control signals in response to the selection of its operating mode which can assume, for example, a switch operation or an automatic operation. A preceding reproducing head $HP_i$ (i=1 to n) supplies a digital signal reproduced from the magnetic tape to reproducing decoder 1 which performs such operations as error correction, error amendment, and the like thereon. Reproducing decoder 1 supplies reproduced pulse coded modulation signals for channels $CH_1$, $CH_2$, $CH_3$, ..., $CH_n$.

The reproduced PCM signals from reproducing decoder 1 are supplied to first input terminals of cross-faders $X_1$, $X_2$, $X_3$, ..., $X_n$ for the corresponding channels. Selector switches $S_1$, $S_2$, $S_3$, ..., $S_n$ are connected, respectively, to input terminals $I_1$, $I_2$, $I_3$, ..., $I_n$. The audio PCM signals from the input terminals $I_i$ (i=1 to n) are supplied to second input terminals of cross-faders $X_i$ (i=1 to n). The output signals from cross-faders $X_i$ (i=1 to n) are supplied to recording encoder 2. Recording encoder 2 encodes the audio PCM signals into formats which include synchronizing signals. Additionally, the encoded PCM signals can have error correction operations performed thereon.

The encoded audio PCM signals from encoder 2 are supplied through a modulating circuit and a recording amplifier to a recording transducer or head $HR_i$ (i=1 to n) for recording on the magnetic tape.

The cross-faders $X_i$ (i=1 to n) are known in the art and are disclosed in, for example, U.S. Pat. No. 4,327,382 by Masato Tanaka, and assigned to the assignee of the present application. As disclosed in the aforementioned U.S. patent, when cross-faders $X_i$ are supplied with two input data signals, cross-faders $X_i$ fade one data signal out while fading in the other data signal so that the transition between the two data signals is smooth. In the illustrated embodiment, cross-faders $X_i$ are controlled in response to control signals generated by system controller 3.

Selectors $S_i$ (i=1 to n) receive at one input terminal the audio PCM signals from input terminals $I_i$ (i=1 to n). A second input terminal of each selector $S_i$ (i=1 to n) is supplied with the output signal from cross-fader $X_i$ (i=1 to n). System controller 3 generates control signals to select one of the two inputs to be supplied by each cross-fader $X_i$ (i=1 to n). In the preferred embodiment, the PCM audio signals from input terminals $I_i$ (i=1 to n) are selected by selectors $S_i$ (i=1 to n) and supplied to cross-faders $X_i$ (i=1 to n), whereby each channel signal $CH_i$ is recorded in channel i. When an editing operation is performed, on the other hand, wherein an audio signal is transferred from one channel to another, the output signal from each of cross-faders $X_i$ (i=1 to n) is selected by selectors $S_i$ (i=1 to n) and supplied to the input terminal of another one of cross-faders $X_i$ corresponding to another channel. For example, in order to perform the editing operation illustrated in FIG. 1, cross-fader $X_i$ corresponding to channel $CH_i$ receives the output signal from cross-fader $X_{i+1}$ corresponding to channel $CH_{i+1}$ (i.e., each cross-fader is supplied with the output signal from the subsequent cross-fader). It is to be appreciated that the cross-fader $X_n$ is supplied with the output signal from cross-fader $X_1$ corresponding to channel $CH_1$.

Reproducing decoder 1 and recording encoder 2 separately perform data processing operations on each channel. Accordingly, reproducing decoder 1 and recording encoder 2 can be single units capable of processing only a single channel signal at a time. In such an embodiment, reproducing decoder 1 and recording encoder 2 process the digital signals corresponding to channels $CH_1$ to $CH_n$ in a time-sharing manner. In a like fashion, cross-faders $X_i$ (i=1 to n) can be a single unit which also operates on the digital data in a time-sharing manner. It is to be appreciated that, in the embodiment of FIG. 2, cross-faders $X_i$ (i=1 to n) are shown as individual cross-faders for each channel for ease of presentation.

Figure 3A:
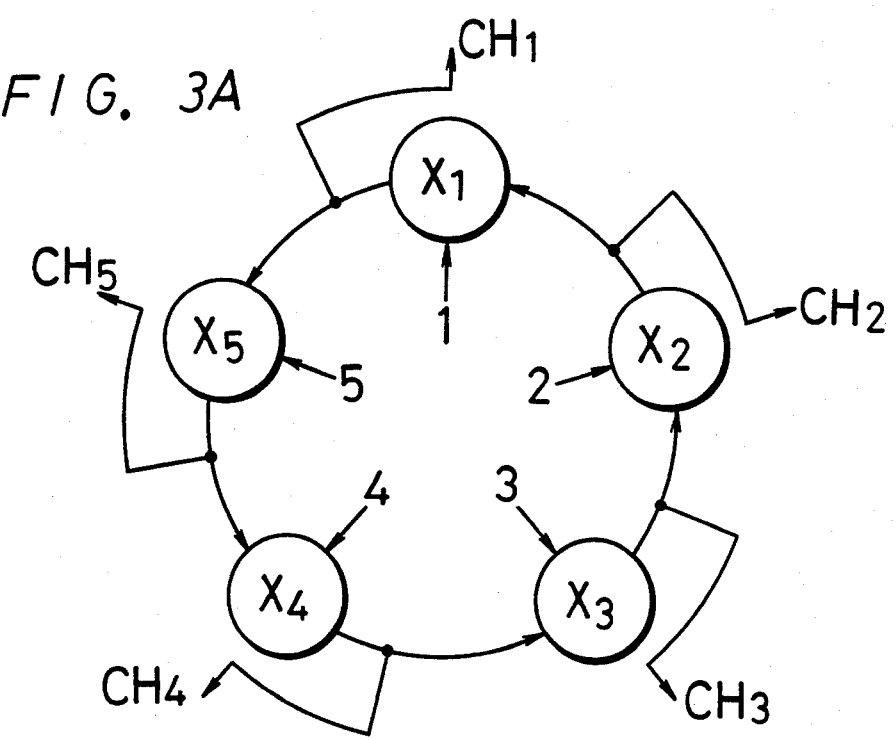
FIGS. 3A to 3C are schematic diagrams to which reference will be made in explaining an editing operation performed by the apparatus of FIG. 2.

FIG. 3A illustrates the transfer of channel signals between cross-faders $X_i$ when there are five channels on the magnetic tape. As illustrated in the figure, channel signal i is supplied to one input terminal of cross-fader $X_i$ (i=1 to 5). The output signal from cross-fader $X_i$ is supplied to a second input terminal of cross-fader $X_{i-1}$. In other words, when the cross-faders $X_i$ (i=1 to 5) are arranged in ascending order, the output signal from each cross-fader $X_i$ (i=2 to 5) is supplied to the input terminal of the preceding cross-fader $X_{i-1}$ (i=2 to 5). The output from cross-fader $X_1$ is supplied to the input terminal of cross-fader $X_5$. Cross-faders $X_i$ (i=1 to 5) are supplied with the reproduced data for each corresponding channel derived from reproducing decoder 1. The output signals from cross-faders $X_i$ (i=1 to 5) are supplied to recording encoder 2 for subsequent processing.

Figure 3B:
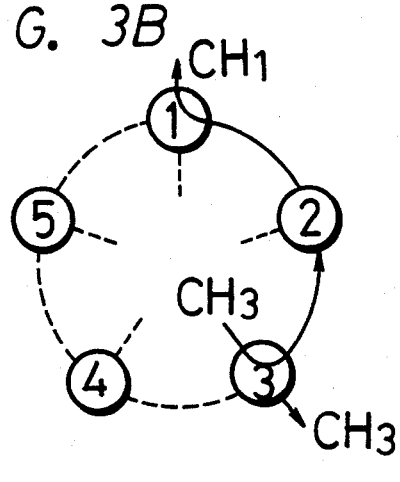

For example, when the channel signal for channel $CH_3$ is recorded in channel $CH_1$, system controller 3 generates control signals for the respective cross-faders $X_i$ (i=1 to 5) so that cross-fader $X_3$ corresponding to channel $CH_3$ selects the output signal corresponding to $CH_3$ of reproducing decoder 1. Cross-fader $X_2$ is supplied with the output signal from cross-fader $X_3$. Cross-fader $X_1$ is supplied with the output signal from cross-fader $X_2$. As shown in FIG. 3B by the solid line, the digital signal reproduced from channel $CH_3$ is supplied through cross-fader $X_3$, cross-fader $X_2$, and cross-fader $X_1$ for recording in channel $CH_1$. It is to be appreciated that the reproducing head corresponding to channel $CH_3$ is placed in the reproducing mode and the recording head corresponding to channel $CH_1$ is placed in the recording mode. The transfer of digital signals from one channel to another can be carried out as aforesaid for other channels.

Figure 3C:
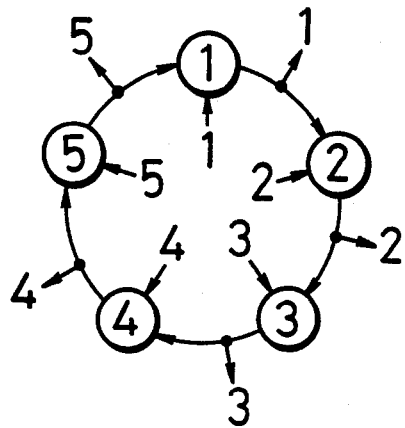

FIGS. 3A and 3B illustrate one embodiment of the present invention in which each cross-fader $X_i$ ($i=1$ to 4) receives the output signal from the following cross-fader $X_{i+1}$ ($i=1$ to 4). (It is to be noted that the output signal from cross-fader $X_1$ is supplied to cross-fader $X_5$.) Alternatively, as illustrated in FIG. 3C, each cross-fader $X_i$ ($i=2$ to 5) can receive the output signal from the preceding cross-fader $X_{i-1}$ ($i=2$ to 5). (It is to be noted that the output signal from cross-fader $X_5$ is supplied to cross-fader $X_1$.) In other words, the output signal from cross-fader $X_{i-1}$ corresponding to channel $CH_{i-1}$ can be supplied to the input terminal of cross-fader $X_i$ corresponding to channel $CH_i$. As illustrated in FIG. 3C, the signal transfer directions are opposite to those illustrated in FIG. 3A.

It is to be appreciated that the number of channels to be edited in a digital PCM tape recorder in accord with the present invention can include all of the channels recorded on the tape or only a portion of the channels.

It is to be further appreciated from the above description that an editing operation such as, for example, changing a digital signal from one channel to another is performed without the use of a mixer or a change in the cable wiring. Such an editing operation is performed with an apparatus in accord with the present invention by controlling a switching circuit to transfer the desired channel signals from one channel to another.

An editing operation performed with an embodiment of the present invention operates strictly on digital data, without any conversion from digital to analog and back to digital. Accordingly, there is no degradation of the audio signal as occurs in prior art editing operations where digital to analog and analog to digital conversions are performed.

As an additional feature of the present invention, the hardware associated with an editing operation is not as complicated in structure as that associated with an editing operation with a prior art apparatus.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. An apparatus for recording and/or reproducing a digital signal made up of a plurality of channel signals digitally recorded in respective tracks on a magnetic record medium, said apparatus comprising:
reproducing means for reproducing said channel signals recorded in said respective tracks;
recording means associated with said tracks for recording digital signals in said tracks; and
selector means for selectively supplying the reproduced channel signals to said recording means for digital recording by the latter in at least a selected one of said tracks on said magnetic record medium, said selector means including fader means with a fader element associated with each of said channel signals and having first and second input terminals and an output terminal, means connected to said reproducing means for supplying an associated reproduced channel signal to said first input terminal, and means for connecting said second input terminal to said output terminal of said fader element associated with another channel signal.

2. The apparatus of claim 1; wherein said fader means selectively supplies said reproduced channel signals seriatim to said recording means for recording in said at least one selected track.

3. The apparatus of claim 2, in which at least two of said channel signals overlap in time; and wherein said fader means fades out one of said two channel signals and fades in the other of said two channel signals during said overlap in time.

4. The apparatus of claim 2; wherein said means for connecting connects said second input terminal to said output terminal of an adjacent one of said fader elements to receive therefrom a reproduced channel signal.

5. The apparatus of claim 4; wherein said selector means includes system controller means for actuating said fader means selectively to supply said reproduced channel signals in a predetermined order to said recording means for recording in said predetermined order in said at least one selected track.

6. The apparatus of claim 4; wherein said reproducing means includes a transducer associated with each of said plurality of tracks on said magnetic record medium.

7. The apparatus of claim 4; wherein said recording means includes a transducer associated with each of said plurality of tracks on said magnetic record medium.

8. The apparatus of claim 4; in which each of said recorded channel signals is encoded to include error correction signals; and further comprising decoding means for decoding said reproduced channel signals so as to remove said error correction signals from said reproduced channel signals to be selectively supplied by said fader elements.

9. The apparatus of claim 8; and further comprising encoding means for restoring said error correction signals to said channel signals selectively supplied by said fader elements to said recording means.

10. An apparatus for recording and/or reproducing a digital signal made up of a plurality of channel signals digitally recorded in respective tracks on a magnetic record medium, said apparatus comprising:
reproducing means for reproducing said channel signals recorded in said respective tracks;
recording means associated with said tracks for recording digital signals in said tracks; and
selector means for selectively supplying the reproduced channel signals to said recording means for digital recording by the latter in at least a selected one of said tracks on said magnetic record medium, said selector means including fader means with fader elements arranged in a cyclical order, and associated with said plurality of channel signals, respectively, for selectively supplying said reproduced channel signals seriatim to said recording means for recording in said at least one selected track, each of said fader elements having an output terminal and first and second input terminals, and wherein said first input terminal is connected to said reproducing means to receive therefrom the associated reproduced channel signal, and further comprising means for connecting said second input terminal to said output terminal of an adjacent one of said fader elements to receive therefrom a reproduced channel signal, and wherein said second input terminal of each said fader elements is connected to said output terminal of an adjacent one of said fader elements in said order.

11. An apparatus for recording and/or reproducing a digital signal made up of a plurality of channel signals digitally recorded in respective tracks on a magnetic record medium, said apparatus comprising:
reproducing means for reproducing said channel signals recorded in said respective tracks;
recording means associated with said tracks for recording digital signals in said tracks; and
selector means for selectively supplying the reproduced channel signals to said recording means for digital recording by the latter in at least a selected one of said tracks on said magnetic record medium, said selector means including fader means with fader elements associated with said plurality of channel signals, respectively, for selectively supplying said reproduced channel signals seriatim to said recording means for recording in said at least one selected track, each of said fader elements having an output terminal and first and second input terminals, and wherein said first input terminal is connected to said reproducing means to receive therefrom the associated reproduced channel signal, further comprising means for connecting said second input terminal to said output terminal of an adjacent one of said fader elements to receive therefrom a reproduced channel signal, and signal source means for supplying at least one second digital signal; and wherein said selector means includes switching means connected to said signal source means and to said output terminal of one of said fader elements and said second input terminal of another of said fader elements for selectively supplying said second digital signal or one of said reproduced terminal signals to the associated fader element.

* * * * *